(12) United States Patent
Freedman (10) Patent No.: US 7,103,675 B1
(45) Date of Patent: Sep. 5, 2006

(54) MULTIPLEXED REQUEST AND REPLY PACKETS

(75) Inventor: Jerome Norman Freedman, Greenbrae, CA (US)

(73) Assignee: Network General Technology, George Town (KY)

( * ) Notice: Subject to any disclaimer, the term of this patent is extended or adjusted under 35 U.S.C. 154(b) by 1062 days.

(21) Appl. No.: 10/154,933

(22) Filed: May 23, 2002

(51) Int. Cl.
*G06F 15/16* (2006.01)

(52) U.S. Cl. .................. 709/234; 709/227; 719/231; 717/132

(58) Field of Classification Search ............... 709/227, 709/234; 719/331, 332; 717/132, 133, 144, 717/156; 712/233–238
See application file for complete search history.

(56) References Cited

U.S. PATENT DOCUMENTS

| | | | |
|---|---|---|---|
| 5,692,168 A * | 11/1997 | McMahan | 712/237 |
| 5,896,537 A * | 4/1999 | Landi et al. | 717/132 |
| 5,913,055 A * | 6/1999 | Yoshida et al. | 712/233 |
| 5,933,640 A * | 8/1999 | Dion | 717/132 |
| 5,933,644 A * | 8/1999 | Wallace | 717/156 |
| 6,014,709 A | 1/2000 | Gulick et al. | |
| 6,119,170 A | 9/2000 | Schoffelman et al. | |
| 6,122,670 A | 9/2000 | Bennett et al. | |
| 6,697,871 B1 | 2/2004 | Hansen | |

OTHER PUBLICATIONS

Stevens, W. Richard, TCP/IP Illustrated, vol. 1, 1994, Addison Wesley, pp. 1248-1251.

* cited by examiner

*Primary Examiner*—Krisna Lim
(74) *Attorney, Agent, or Firm*—Fenwick & West LLP (57) ABSTRACT

Primary and alternate circuits on protocol flow objects representing application protocol layers in a communications channel are linked to connect multiplexed requests and replies. Various protocol flow objects are arranged in a hierarchical flow tree data structure that corresponds to multiple protocol layers in the channel. One branch of the flow tree data structure is selected to represent a reply, and source-destination address pairs for lower layer protocol flow objects for the reply are used to identify the branch of the flow tree data structure that represents the corresponding request. In one aspect, the address pairs for network and transport layer protocol flow objects for the reply are used to identify the request branch. In a further aspect, a link layer protocol object corresponding to the link layer protocol object for the reply may be used to reduce the number of network and transport protocol flow objects examined to identify the request branch.

30 Claims, 7 Drawing Sheets

MULTIPLEXED REQUEST AND REPLY PACKETS

RELATED APPLICATIONS

This application is related to U.S. patent application Ser. No. 09/678,145, filed on Oct. 3, 2000, now U.S. Pat. No. 6,968,554, issued Nov. 22, 2005, and assigned to the same assignee as the present application.

FIELD OF THE INVENTION

This invention relates generally to computer networks, and more particularly to processing protocol data flows having multiplexed request and reply packets within a computer network.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Networks Associates Technology, Inc., All Rights Reserved.

BACKGROUND OF THE INVENTION

Communication links between two computers on a network, such as the Internet or a local-area network, are subject to various types of degradation and failure conditions. Protocol analysis is frequently used to determine where potential problems exist in a network. Messages flowing through a communication channel between two computers are encoded into "protocol data units" according to a multi-layered data communication protocol, such as defined in the OSI (Open Systems Interconnection) model. By capturing the protocol data units, the data at each protocol layer can be extracted and reassembled to form the messages.

Proper analysis of the messages for certain protocols depends on matching corresponding request and reply messages. Generally, this is easily accomplished because corresponding protocol data units contain identical address pairs, with the source and destination addresses reversed between the protocol data units for the request and the reply. However, many computers now contain more than one network interface card. If such a computer receives a request on one network interface, it may send the reply on a different network interface, resulting in two different address pairs for the request and reply protocol data units at the data link protocol layer. Additionally, the addresses for the request and reply may not match because of routers and/or switches in the network.

SUMMARY OF THE INVENTION

Primary and alternate circuits on protocol flow objects representing application protocol layers in a communications channel are linked to connect multiplexed requests and replies. Various protocol flow objects are arranged in a hierarchical flow tree data structure that corresponds to multiple protocol layers in the channel. One branch of the flow tree data structure is selected to represent a reply, and source-destination address pairs for lower layer protocol flow objects for the reply are used to identify the branch of the flow tree data structure that represents the corresponding request. In one aspect, the address pairs for network and transport layer protocol flow objects for the reply are used to identify the request branch. In a further aspect, a link layer protocol object corresponding to the link layer protocol object for the reply may be used to reduce the number of network and transport protocol flow objects examined to identify the request branch.

The present invention describes systems, clients, servers, methods, and machine-readable media of varying scope. In addition to the aspects of the present invention described in this summary, further aspects will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A system level overview of the operation of an embodiment of the invention is described by reference to FIGS. 1, 2A–B and 3A–B. Beginning with FIG. 1, a communication channel 120 is established between two computers, computer A 101 and computer B 103. Computer B 103 may be a client connected to computer A 101 that is functioning as a server. Exemplary embodiments of the client and server computers and various communications channels are described in more detail below in conjunction with FIGS. 5A–B. As is conventional, the data flowing through the communication channel 120 is encoded into "protocol data units" (PDUs) according to a multi-layered data communication protocol. An Ethernet network and the standard TCP/IP protocol stack are used as examples herein, but the invention is not so limited. Frequently, protocol data units exchanged at the lowest protocol layer are referred to as "frames," while those at the higher protocol layers are referred to as "packets." For simplicity in describing the invention, the data exchanged at all layers is referred to herein as PDUs, and such usage is further clarified with the number or name of the corresponding protocol layer when appropriate.

Figure 1:
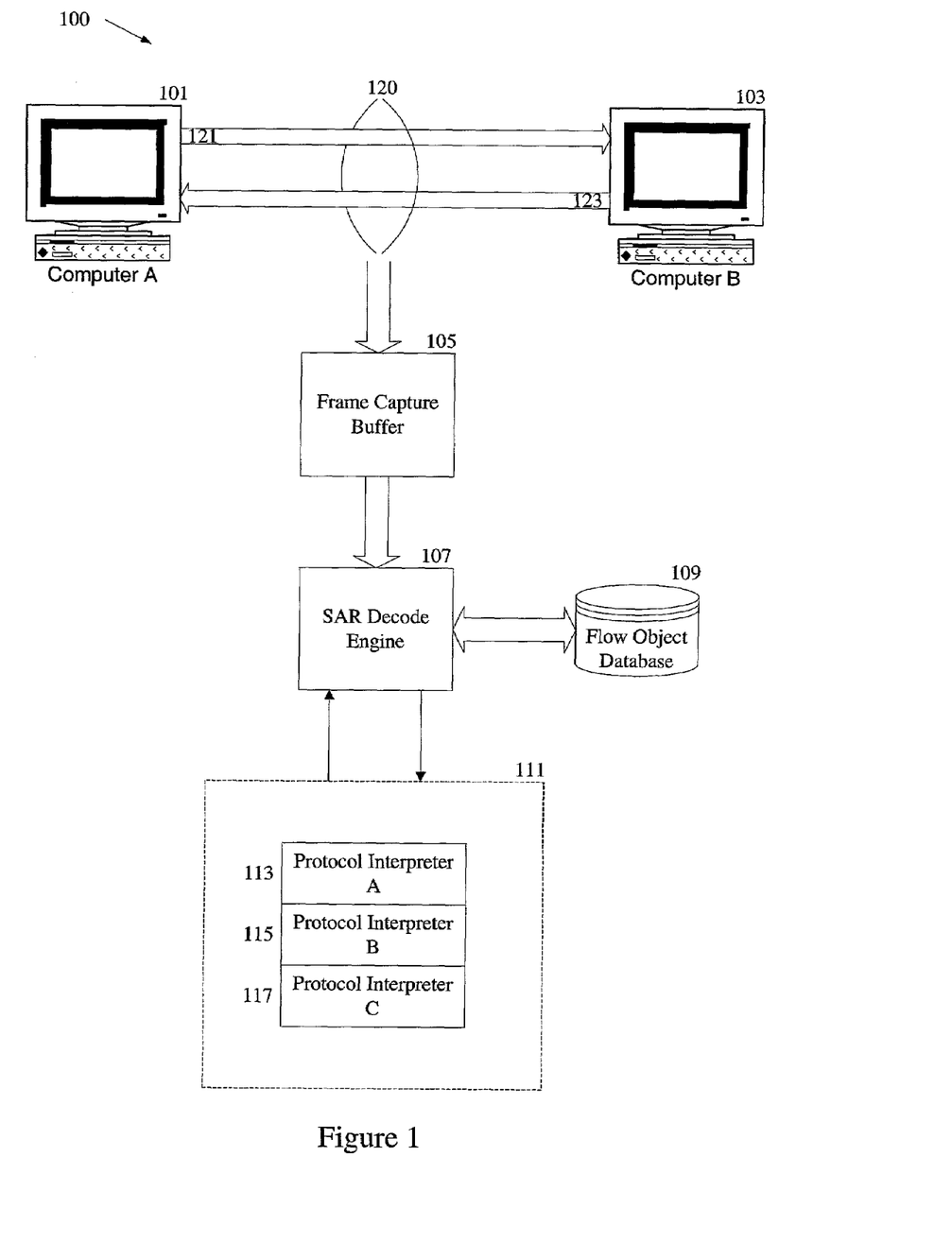
FIG. 1 is a diagram illustrating a system-level overview of an embodiment of the invention.

Protocol data units in the communications channel 120 are captured in a frame capture buffer 105 using a standard protocol analysis tool and retrieved by a segmentation and re-assembly (SAR) decode engine 107. Multiple protocol interpreters, collectively shown at 111, are used by the SAR decode engine 107 to determine the appropriate sequencing or reassembly of the data into the data flow recognized by a particular protocol layer. The SAR decode engine 107 creates various flow objects to represent the data flows at each level and stores the flow objects in a flow object database 109 as described next. The SAR decode engine 107 is also responsible for unpacking the PDUs in creating the flow objects and for correctly re-assembling the data in the PDUs into the messages exchanged by the computers.

Figure 2A:
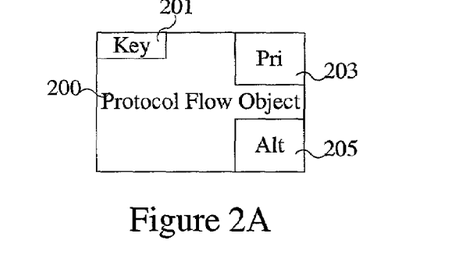
FIG. 2A is a diagram of a protocol flow object data structure for use in an embodiment of the invention.

The SAR decode engine 107 creates protocol flow objects to represent the protocol layers in the communication channel 120 and circuit flow objects to represent the data flow at a layer as decoded by the protocol interpreters 111. One embodiment of a protocol flow object data structure is shown in FIG. 2A. The protocol flow object 200 contains a key 201 used to identify the particular protocol flow object within the flow object database 109. The protocol flow object 201 also contains two circuit elements that link the circuit flow objects to the protocol flow object 201. A primary circuit element 203 is linked to a series of circuit flow objects that represent the data being transmitted in one direction between the computers 101 and 103 and define a one-way circuit 121 in the communications channel 120. An alternate circuit element 205 is linked to a series of circuit flow objects that define the opposite circuit 123 within the channel 120. In one embodiment, the primary circuit is determined by the transmission direction of the first PDU that is received in the frame capture buffer 105 but it will be appreciated that the primary and alternate circuits may be pre-determined based on various criteria, such as the whether the source computer functions as the client or server in a client-server network. It will further be appreciated that the key and the logical links can be address pointers, hash table values, or similar data structures conventionally used to locate and relate records within a data base or other data organization.

The protocol flow objects created for the channel 120 are logically linked together by the SAR decode engine 270 in a hierarchical flow tree data structure. In a TCP/IP network, a corresponding flow tree 220 shown in FIG. 2B has at its base a root flow object 221, which is linked to a data link layer protocol flow object, shown as DLC protocol object 223. The network layer protocol is the Internet Protocol (IP) and is represented in the tree 220 by the IP protocol flow object 225. In the present example, there are two connections between the computers at the transport protocol layer, one for retrieving HTML formatted web pages using the HTTP application protocol and one for retrieving data from a Microsoft SQL database using a tabular data stream (TDS) protocol. Therefore, two TCP protocol flow objects are created at the transport layer and linked to the IP protocol flow object 225 in the tree 220, one for each connection. TCP protocol flow object 227 represents the connection between the two computers used to transport the requests for web pages and the corresponding web pages, while TCP protocol flow object 229 represents the connection that transports the SQL commands and resulting data. Similarly, there are two protocol flow objects at the application protocol level of the tree 220, an HTTP protocol flow object 231 and a Microsoft (MS) SQL protocol flow object 233, linked to their respective TCP protocol objects.

The key 201 for each protocol flow object may be either a source identifier, when it alone is sufficient to specify the appropriate protocol object, or a combination of both source and destination identifiers. One of skill in the art will immediately recognize that the tree 220 shown in FIG. 2B is a simplified version of the types of hierarchical flow trees that can be created for the connections between two computers.

Figure 2B:
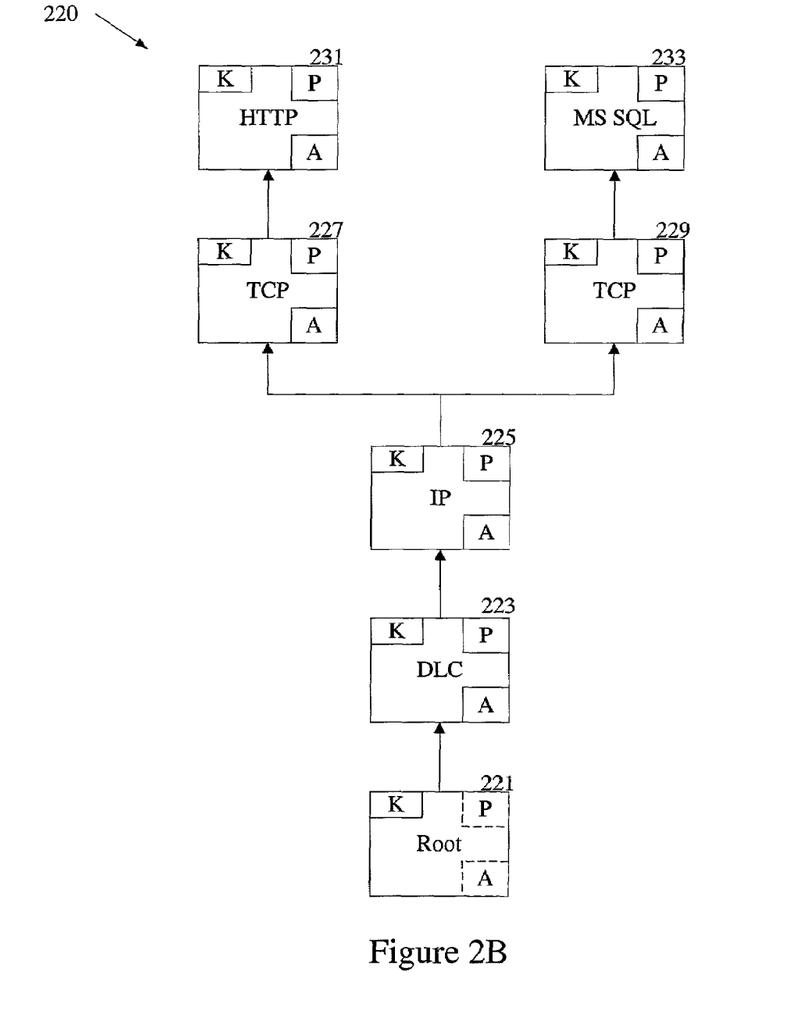
FIG. 2B is a diagram of flow tree data structure for use in an embodiment of the invention.

Although not illustrated in FIG. 2B, each of the protocol flow objects in the tree 220 is further linked to the circuit flow objects that represent the primary and alternate circuits of the connection at that level. The circuit flow objects linked to a protocol flow object for a particular protocol layer represent the payloads of the PDUs for that layer. Assuming a request PDU is seen before the reply PDU, the circuit flow objects for a request will be linked to the primary circuit of a protocol object and the circuit flow objects for a reply will be linked to the alternate circuit. The configuration of the circuit flow objects depends upon the characteristics of the associated protocol layer. The circuit flow objects are not illustrated in FIGS. 2B and 3A–B to avoid obscuring the description of the present invention and the further details of the circuit flow objects are not necessary to understand the present invention. A detailed description of the SAR decode engine 107 and the various flow objects may be found in the related U.S. patent application Ser. No. 09/678,145.

Figure 3A:
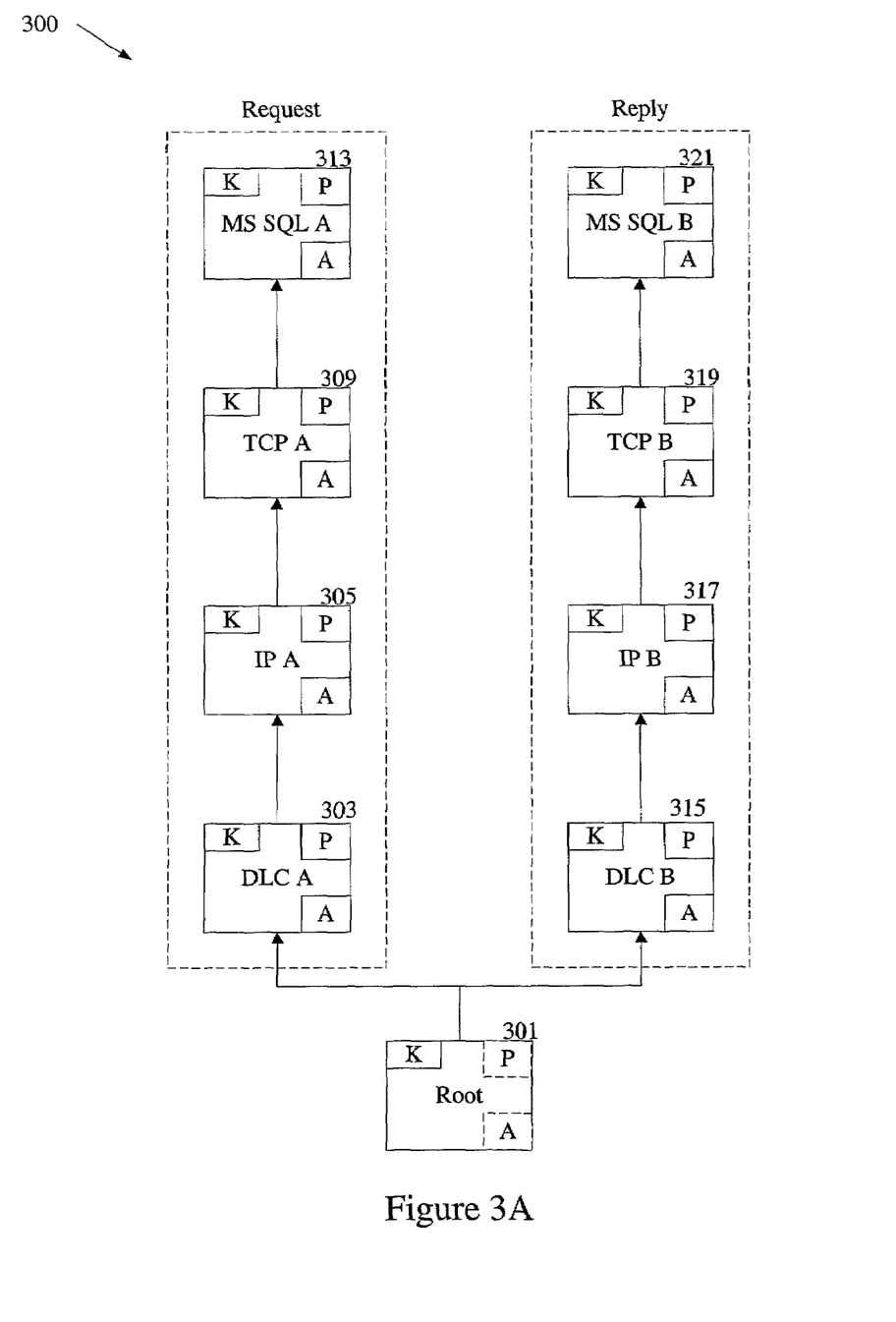
FIGS. 3A–B are diagrams of flow tree data structures for multiplexed request and reply packets according to one embodiment of the invention.

In an exemplary embodiment, the SAR decode engine 107 identifies the primary and alternate circuits for a protocol flow object by the addresses in the PDUs, with the source-destination address pair for one circuit being the inverse of the source-destination address pair for the other circuit. However, when one or both ends of the connection contain multiple network interfaces, or when the data is routed through a network router or switch, the two corresponding circuits at the data link layer may have only one address in common, or no address at all, i.e. the data flows are multiplexed. An example of the flow tree data structure that represents multiplexed data flows is shown in FIG. 3A.

For purposes of illustration, assume the first PDUs captured in the buffer 105 for the channel 120 corresponds to an MS SQL database request from client computer B 103 to server computer A 101. The SAR decode engine 107 creates a root flow object 301 for the connection, extracts the DLC address pair from the captured PDUs and creates a protocol flow object DLC A 303 for that address pair. The protocol interpreters 111 instruct the SAR decode engine 107 to create corresponding circuit flow objects, which are linked to the primary circuit of protocol flow object DLC A 303. As the SAR engine creates the higher layer protocol flow objects IP A 305, TCP A 309, and MS SQL A 313, it also links the corresponding circuit flow objects to their primary circuits.

When the SAR decode engine 107 extracts the DLC address pair from the MS SQL database reply PDUs, the reply DLC address pair will not be the inverse of the request DLC pair because the data flows are multiplexed. Therefore, instead of linking the DLC circuit objects for the reply to the alternate circuit of protocol flow object DLC A 303, the SAR decode creates a protocol flow object DLC B 315 and links the reply circuit flow objects to the primary circuit of protocol flow object DLC B 315. The remaining protocol layers in the reply are unpacked into protocol flow objects IP B 317, TCP B 319, and MS SQL B 321, with the corresponding circuit objects linked to their primary circuits. Since two separate flow trees are created for the request and reply, the reassembly of messages for a protocol that requires both the request and the reply data will fail.

Figure 3B:
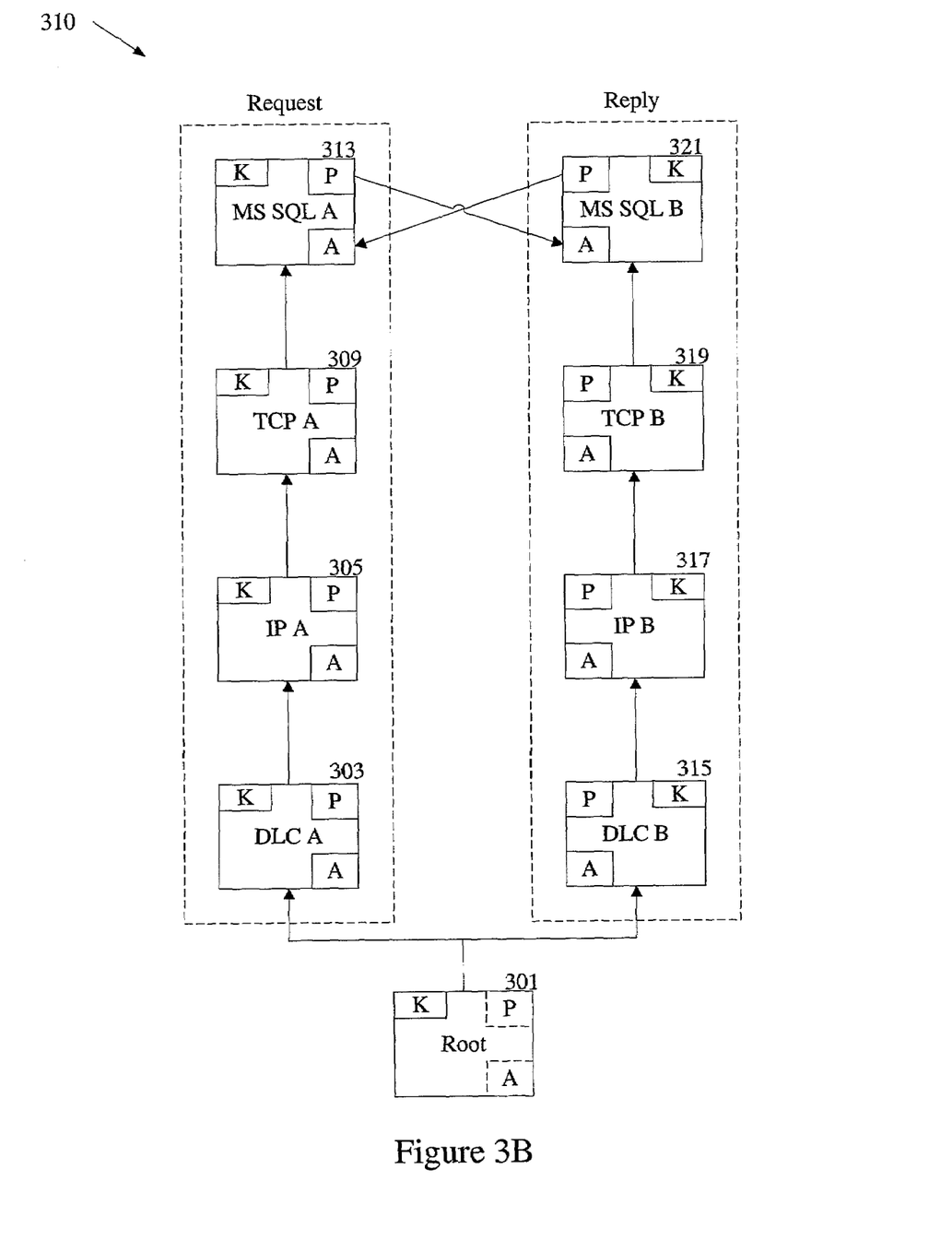

To properly reassemble such messages, the present invention logically links the separate flow trees for the request and reply together at the application protocol layer when multiplexing has been enabled for the application protocol, as shown in FIG. 3B for MS SQL. The primary circuit flow objects for the reply protocol flow object 321 are logically linked to the alternate circuit of the request protocol flow object 313, and the primary circuit flow objects for the request protocol flow object 313 are logically linked to the alternate circuit of the reply protocol flow object 321. It will be appreciated that the primary and alternate circuit flow objects at the lower protocol levels may be cross-linked as well if desired.

Figure 4:
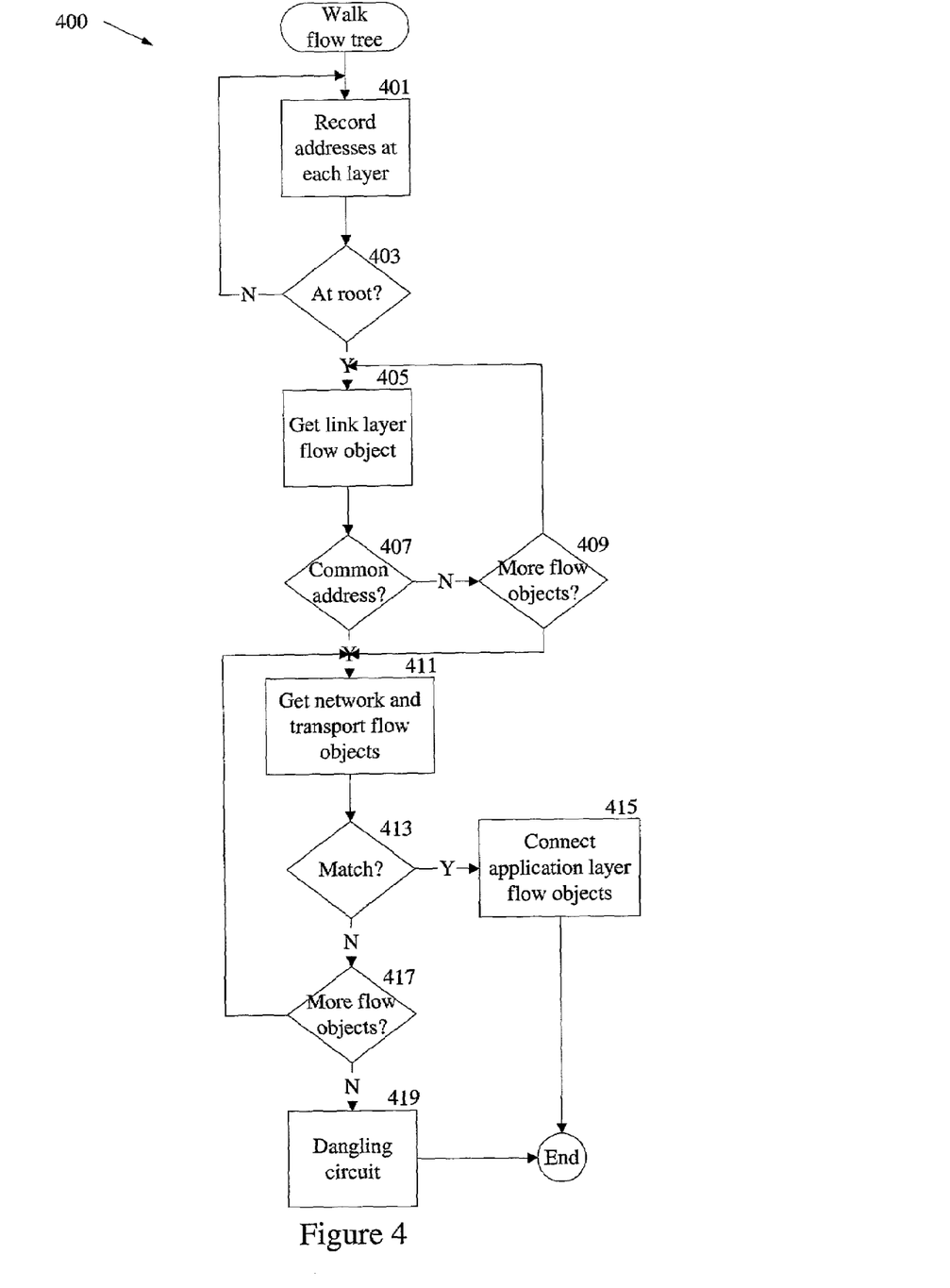
FIG. 4 is a flowchart of method to be performed by a computer according to an embodiment of the invention.

One embodiment of a method 400 to be performed by the SAR decode engine 107 to logically link the separate flow trees at the application protocol layer is described with reference to flowchart shown in FIG. 4. The walk flow tree method 400 is invoked when a protocol flow object is created at the application layer and the application protocol requires matching requests and replies for proper analysis. The invocation may be set as a default for certain protocols, may be the default for all protocols, or may be requested for a particular protocol.

Assume for purposes of illustration that the method 400 has been invoked because the application protocol flow object for a reply has been created. The method 400 attempts to identify the branch of the flow tree that represents the request by matching the source-destination address pairs for the network and transport protocol flow objects with those of the reply branch. Starting at the application protocol flow object, the method 400 records the source-destination address pair for each protocol flow object in the flow tree for the reply (block 401) until it reaches the root protocol flow object (block 403). The method 400 examines the set of link layer protocol flow objects attached to the root for a corresponding link layer protocol flow object that has one address in common with the addresses for reply link layer protocol flow object (block 405). Finding a corresponding link layer protocol flow object reduces the number of network and transport protocol flow objects that have to be examined to identify the request branch.

If a corresponding link layer protocol flow object is found (block 407), the method 400 examines the network and transport protocol flow objects linked to it for address pairs that are the inverse of the address pairs for the reply network and transport protocol flow objects (block 411). Matching address pairs identify the request branch (block 413), and the application protocol flow object in the request branch is linked to the application protocol flow object in the reply branch as described above with reference to FIG. 3B (block 415). If none of the address pairs match (block 417), the method 400 assumes the reply is a "dangling" circuit, i.e., the corresponding request was not captured (block 419).

If no corresponding a link layer protocol flow object is found at block 407, the method 400 examines all the network and transport protocol flow objects attached to the set of link layer protocol flow objects for matching, but inverted, address pairs at block 411 until a match is found at block 413, or the reply is assumed to be a dangling circuit at block 419.

In an alternate embodiment, the method 400 does not attempt to match the network and transport layer protocol flow objects if a corresponding reply data link layer flow object is not found at block 407 and proceeds directly to block 419. In still another alternate embodiment, the method 400 records only the source-destination address pairs for the network and transport protocol layers of the reply at block 401 as it walks down the reply branch of the flow tree and proceeds directly from block 403 to block 411, where it examines all the network and transport protocol flow objects attached to the set of link layer protocol flow objects.

It will be appreciated that the method 400 may be invoked when the application layer protocol flow object for a request is created but if the reply has not yet been captured, the method 400 will be unable to find the protocol flow objects for the reply. In this case, the method 400 will assume the request is a dangling circuit at block 419, but will logically link the request and reply trees when the application layer protocol flow object for the reply is created and the method 400 is subsequently invoked. Furthermore, one of skill in the art will immediately understand that a request may be captured in the buffer 105 but not the subsequent reply, resulting in a dangling request circuit that cannot be matched.

In practice, the method 400 may constitute one or more programs made up of machine-executable instructions. Describing the method with reference to the flowchart in FIG. 4 enables one skilled in the art to develop such programs, including such instructions to carry out the operations (acts) represented by logical blocks 401 until 419 on suitably configured machines (the processor of the machine executing the instructions from machine-readable media). The machine-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a machine causes the processor of the machine to perform an action or produce a result. It will be further appreciated that the acts described in conjunction with FIG. 4 are not required to be performed in the particular order shown and that the processes of the invention may be divided into more or fewer logical blocks than those shown. In particular, although the exemplary method of FIG. 4 operates with a protocol stack having only four layers (link, network, transport and application), one of skill in the art will readily understand how to adapt the invention to protocol stacks having more or few layers.

Figure 5A:
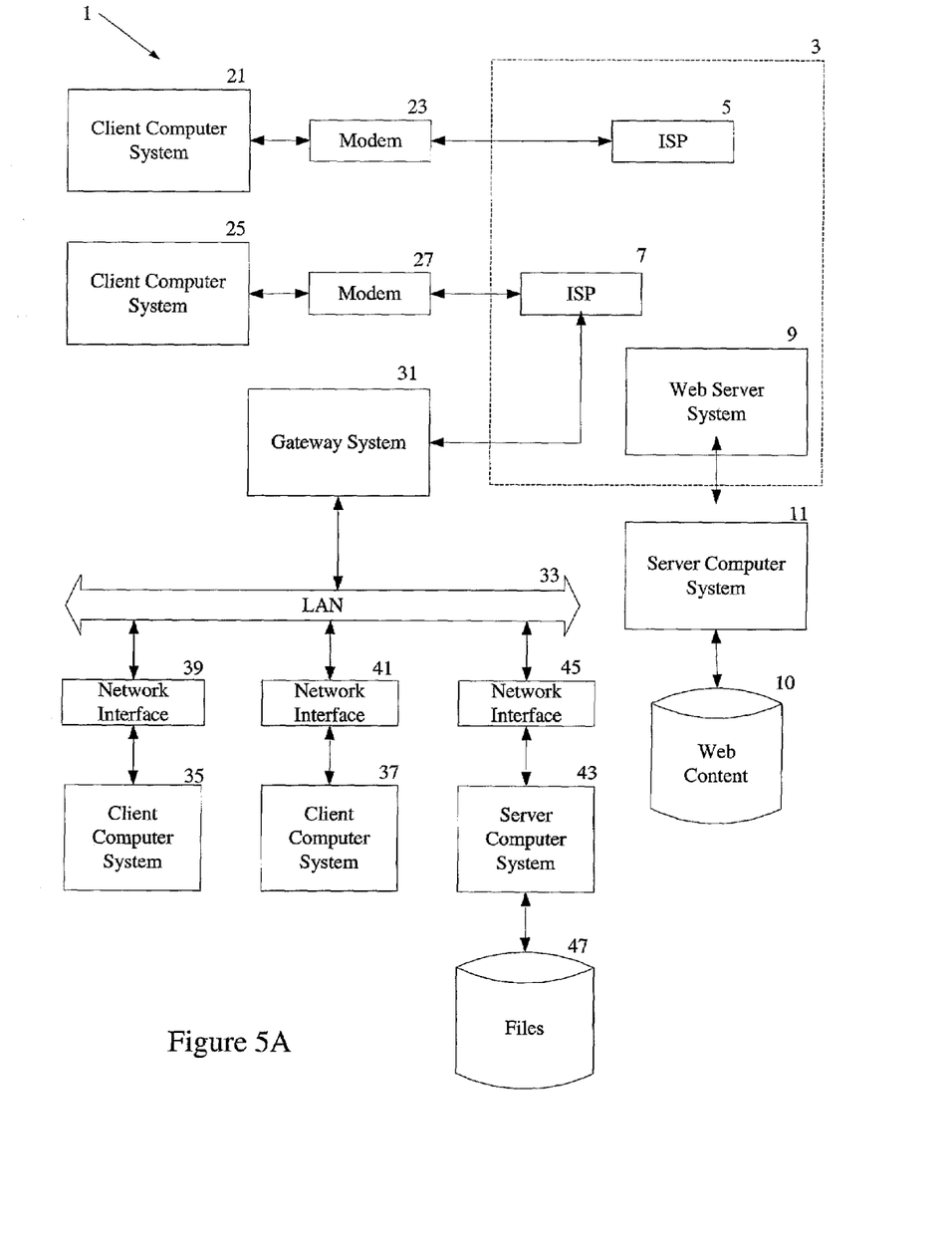
FIG. 5A is a diagram of one embodiment of an operating environment suitable for practicing the present invention.
Figure 5B:
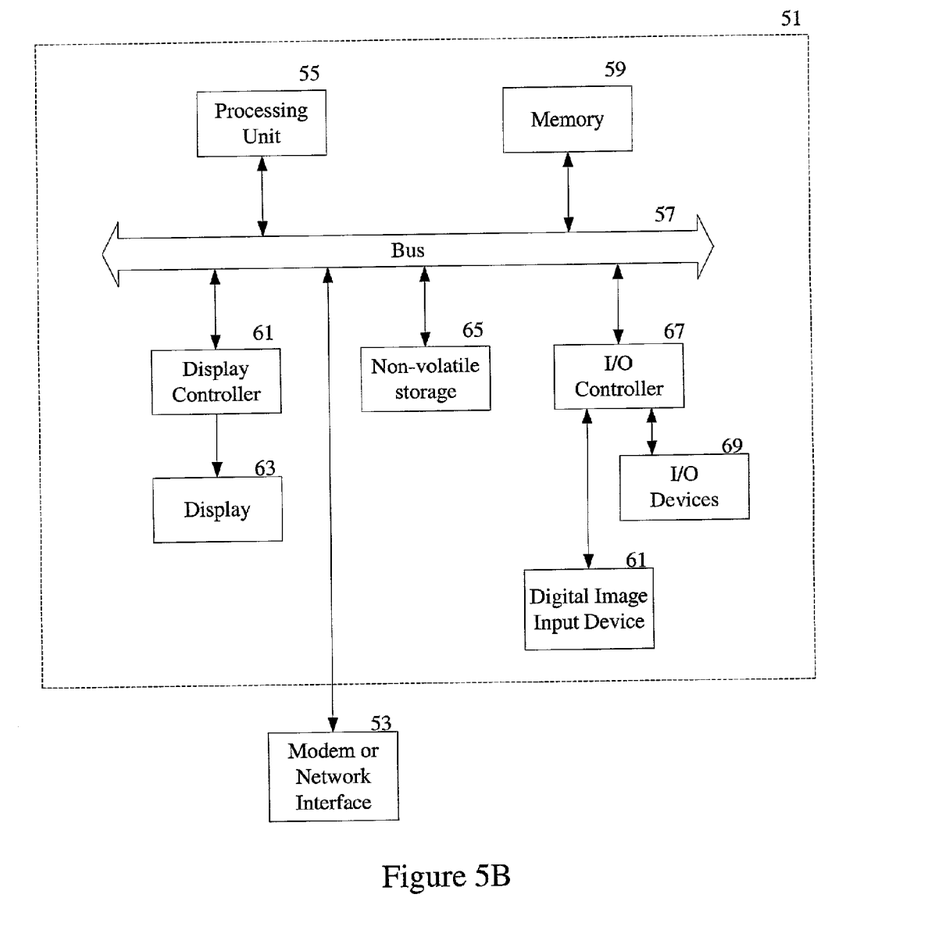
FIG. 5B is a diagram of one embodiment of a computer system suitable for use in the operating environment of FIG. 5A.

The following description of FIGS. 5A–B is intended to provide an overview of computer hardware and other operating components suitable for implementing the invention, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network having a physical or wireless infrastructure, or a combination of both.

FIG. 5A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7. Users on client systems, such as client computer systems 21, 25, 35, and 37 obtain access to the Internet through the Internet service providers, such as ISPs 5 and 7, through either physical or wireless interfaces. Access to the Internet allows users of the client computer systems to exchange information, receive and send e-mails, and view documents, such as documents which have been prepared in the HTML format. These documents are often provided by web servers, such as web server 9 which is considered to be "on" the Internet. Often these web servers are provided by the ISPs, such as ISP 5, although a computer system can be set up and connected to the Internet without that system being also an ISP as is well known in the art.

The web server 9 is typically at least one computer system which operates as a server computer system and is configured to operate with the protocols of the World Wide Web and is coupled to the Internet. Optionally, the web server 9 can be part of an ISP which provides access to the Internet for client systems. The web server 9 is shown coupled to the server computer system 11 which itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11 which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 which can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 which can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as well-known, a server computer system 43 can be directly coupled to the LAN 33 through a network interface 45 to provide files 47 and other services to the clients 35, 37, without the need to connect to the Internet through the gateway system 31.

FIG. 5B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63 which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 71 can be a digital camera which is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems which have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 5B, such as certain input or output devices. A typical computer system will usually include at least a processor, memory, and a bus coupling the memory to the processor.

It will also be appreciated that the computer system 51 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

The logical linking of primary and alternate circuits on protocol flow objects that represent multiplexed data flows has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill in the art will appreciate that while the invention as been described in terms of a particular protocol in which data flows may be multiplexed, the present invention is equally applicable to all multilayer communication protocols. Therefore, it is manifestly intended that this invention be limited only by the

What is claimed is:

1. A computerized method for linking multiplexed requests and replies in a communications channel, the method comprising:
    selecting a branch of a flow tree data structure to represent a reply, the flow tree data structure having a hierarchy corresponding to multiple protocol layers in the communications channel and the branch containing protocol flow objects for each protocol layer of the reply;
    identifying the branch of the flow tree data structure that represents a request corresponding to the reply, the branch containing protocol flow objects for each protocol layer of the request;
    connecting a primary circuit for an application protocol flow object for the reply to an alternate circuit for an application protocol flow object for the request; and
    connecting a primary circuit for the application protocol flow object for the request to an alternate circuit for application protocol flow object in the branch for the reply.

2. The computerized method of claim 1, wherein the identifying comprises:
    searching a set of network and transport protocol flow objects in the flow tree data structure for matching address pairs with network and transport protocol flow objects for the reply, wherein the branch of the flow tree data structure containing matching network and transport protocol flow objects represents the request.

3. The computerized method of claim 2, wherein the identifying further comprises:
    searching a set of data link layer protocol flow objects in the flow tree data structure for a corresponding link layer protocol flow object that has one address in common with the data link layer protocol flow object for the reply; and
    searching the network and transport protocol flow object linked to the corresponding link layer protocol flow object if found.

4. The computerized method of claim 3, wherein if no corresponding data link layer protocol flow object is found, the branch of the flow tree data structure representing the reply represents a dangling circuit.

5. The computerized method of claim 2, wherein if no matching network and transport layer protocol flow objects are found, the branch of the flow tree data structure representing the reply represents a dangling circuit.

6. The computerized method of claim 2 further comprising:
    traversing the branch of the flow tree data structure representing the reply to find the protocol flow objects for the reply.

7. The computerized method of claim 6 further comprising:
    recording address pairs for each protocol flow object in the branch of the flow data tree structure representing the reply.

8. The computerized method of claim 1, wherein selecting the branch comprises:
    using the branch containing a recently created application layer protocol flow object.

9. The computerized method of claim 1, wherein the request and reply protocol flow objects define opposite circuits in the communications channel.

10. The computerized method of claim 9, wherein the primary circuits of the request and reply protocol flow objects represent the opposite circuits in the communications channel.

11. A machine-readable medium having executable instructions to cause a machine to perform a method comprising:
    selecting a branch of a flow tree data structure to represent a reply, the flow tree data structure having a hierarchy corresponding to multiple protocol layers in a communications channel and the branch containing protocol flow objects for each protocol layer of the reply;
    identifying the branch of the flow tree data structure that represents a request corresponding to the reply, the branch containing protocol flow objects for each protocol layer of the request;
    connecting a primary circuit for an application protocol flow object for the reply to an alternate circuit for an application protocol flow object for the request; and
    connecting a primary circuit for the application protocol flow object for the request to an alternate circuit for application protocol flow object in the branch for the reply.

12. The machine-readable medium of claim 11, wherein the identifying comprises:
    searching a set of network and transport protocol flow objects in the flow tree data structure for matching address pairs with network and transport protocol flow objects for the reply, wherein the branch of the flow tree data structure containing matching network and transport protocol flow objects represents the request.

13. The machine-readable medium of claim 12, wherein the identifying further comprises:
searching a set of data link layer protocol flow objects in the flow tree data structure for a corresponding link layer protocol flow object that has one address in common with the data link layer protocol flow object for the reply; and
searching the network and transport protocol flow object linked to the corresponding link layer protocol flow object if found.

14. The machine-readable medium of claim 13, wherein if no corresponding data link layer protocol flow object is found, the branch of the flow tree data structure representing the reply represents a dangling circuit.

15. The machine-readable medium of claim 12, wherein if no matching network and transport layer protocol flow objects are found, the branch of the flow tree data structure representing the reply represents a dangling circuit.

16. The machine-readable medium of claim 12, wherein the method further comprises:
traversing the branch of the flow tree data structure representing the reply to find the protocol flow objects for the reply.

17. The machine-readable medium of claim 16, wherein the method further comprises:
recording address pairs for each protocol flow object in the branch of the flow data tree structure representing the reply.

18. The machine-readable medium of claim 11, wherein selecting the branch comprises:
using the branch containing a recently created application layer protocol flow object.

19. The machine-readable medium of claim 11, wherein the request and reply protocol flow objects define opposite circuits in the communications channel.

20. The machine-readable medium of claim 19, wherein the primary circuits of the request and reply protocol flow objects represent the opposite circuits in the communications channel.

21. A system comprising:
a processor coupled to a memory through a bus;
a network interface coupled to the processor through the bus and operable for coupling to a communications channel;
a flow tree data structure stored in the memory and having a hierarchy corresponding to multiple protocol layers in the communications channel; and
a process executed from the memory by the processor to cause the processor to
select a branch of a flow tree to represent a reply, the branch containing protocol flow objects for each protocol layer of the reply,
identify the branch of the flow tree data structure that represents a request corresponding to the reply, the branch containing protocol flow objects for each protocol layer of the request,
connect a primary circuit for an application protocol flow object for the reply to an alternate circuit for an application protocol flow object for the request; and
connect a primary circuit for the application protocol flow object for the request to an alternate circuit for application protocol flow object in the branch for the reply.

22. The system of claim 21, wherein the process further causes the process to search a set of network and transport protocol flow objects in the flow tree data structure for matching address pairs with network and transport protocol flow objects for the reply to identify the branch, wherein the branch of the flow tree data structure containing matching network and transport protocol flow objects represents the request.

23. The system of claim 22, wherein process further causes the processor to
search a set of data link layer protocol flow objects in the flow tree data structure for a corresponding link layer protocol flow object that has one address in common with the data link layer protocol flow object for the reply, and
search the network and transport protocol flow object linked to the corresponding link layer protocol flow object if found to identify the branch.

24. The system of claim 23, wherein the process causes the processor to designate the branch of the flow tree data structure representing the reply as a dangling circuit if no corresponding data link layer protocol flow object is found.

25. The system of claim 22, wherein the process causes the processor to designate the branch of the flow tree data structure representing the reply as a dangling circuit if no matching network and transport layer protocol flow objects are found.

26. The system of claim 22, wherein the process further causes the processor to traverse the branch of the flow tree data structure representing the reply to find the protocol flow objects for the reply.

27. The system of claim 26, wherein the process further causes the processor to record address pairs for each protocol flow object in the branch of the flow data tree structure representing the reply.

28. The system of claim 21, wherein the process further causes the processor to use the branch containing a recently created application layer protocol flow object to select the branch.

29. The system of claim 21, wherein the request and reply protocol flow objects define opposite circuits in the communications channel.

30. The system of claim 29, wherein the primary circuits of the request and reply protocol flow objects represent the opposite circuits in the communications channel.

* * * * *